(No Model.)
H. SCHWEITZER.
CLUTCH.
No. 298,780. Patented May 20, 1884.
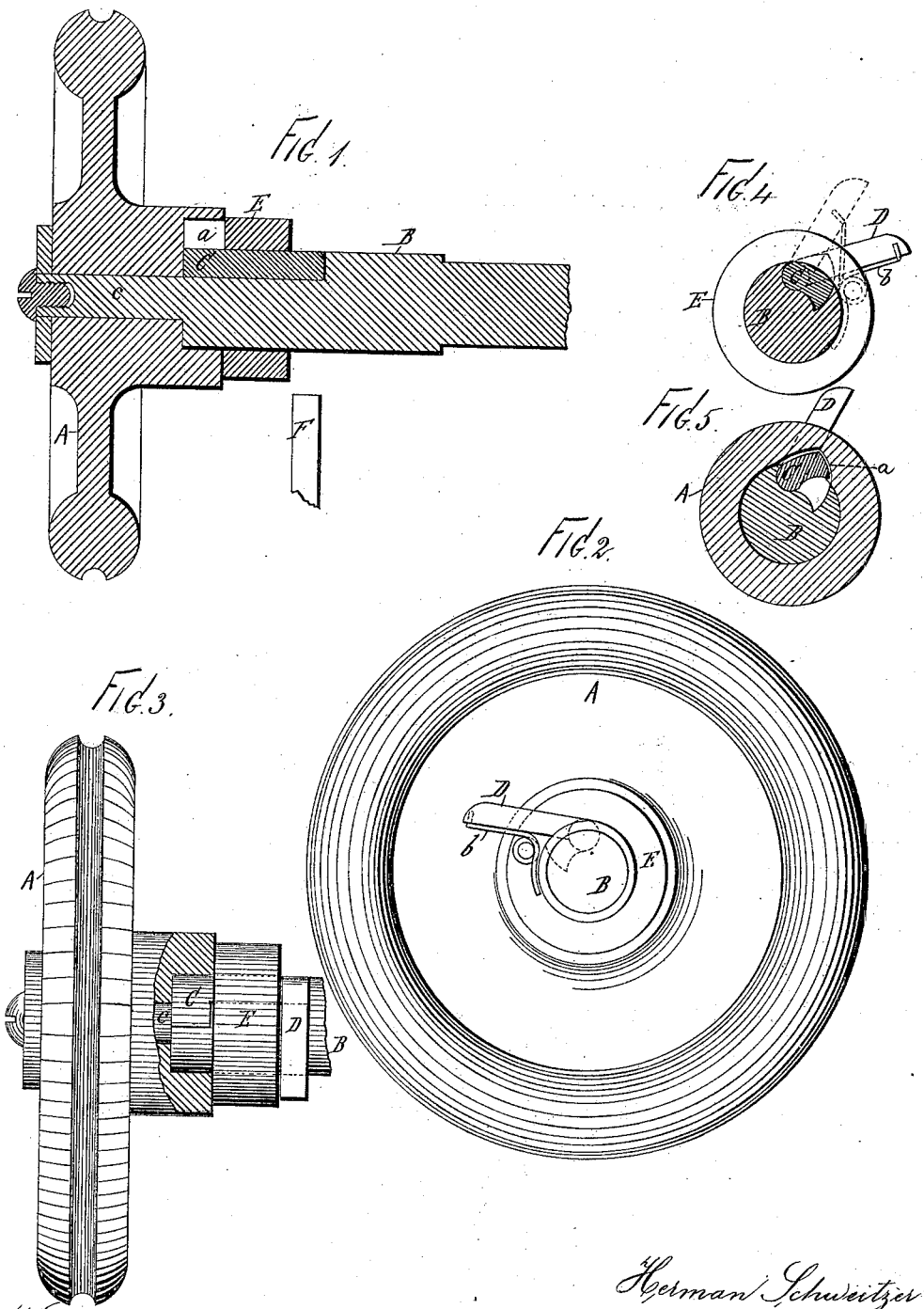
Witnesses
John Buchler,
Henry Lieb,
Herman Schweitzer
Inventor
By North Osgood
Attorney

UNITED STATES PATENT OFFICE.

HERMAN SCHWEITZER, OF BROOKLYN, NEW YORK.

CLUTCH.

SPECIFICATION forming part of Letters Patent No. 298,780, dated May 20, 1884.

Application filed March 26, 1884. (No model.)

*To all whom it may concern:*

Be it known that I, HERMAN SCHWEITZER, of Brooklyn, in the county of Kings and State of New York, have invented certain new and useful Improvements in Clutches, of which the following is a full, clear, and exact description, reference being had to the accompanying drawings, and to the letters of reference marked thereon.

My invention has relation to clutches intended for connecting a revolving wheel or pulley and its shaft or disconnecting them, so that one may revolve without turning the other.

The object of my invention is to produce a simple, cheap, durable, and effective clutch which may be easily thrown in and out of engagement without danger of catching, and which shall produce a positive union between the wheel or pulley and shaft in no way liable to slip, at the same time affording a smooth extended axle for the wheel to run upon. To accomplish this, my improvements involve certain novel and useful peculiarities of construction, relative arrangements or combinations of parts, and principles of operation, all of which will be herein first fully described, and then pointed out in the claims.

In the accompanying drawings, forming part of this specification, Figure 1 is an axial section and elevation of a wheel or pulley and its shaft having my improved clutch applied thereon and adjusted so that the wheel may move without turning the shaft. Fig. 2 is an end elevation looking toward the wheel. Fig. 3 is a plan or top view, a portion of the hub of the wheel being broken out to show the clutch-block therein. Fig. 4 is a cross-section and elevation upon a plane passing through the shaft and clutch-block, and looking from the wheel and omitting the hub thereof. Fig. 5 is a similar view upon a plane passing through the hub, and showing the clutch-block in engaging position.

In all these figures like letters of reference, wherever they occur, indicate corresponding parts.

A is the wheel or pulley, the same being supposed to be driven by power applied through the medium of a belt or other suitable connections.

B is the shaft, which may be of any length, and supposed to operate any tool or to do other required work. The wheel is provided with an enlarged hub, as plainly shown, and this is for the accommodation of the clutch-block and the portion of the shaft which carries said block, the same being made amply heavy and strong to withstand all strains likely to be brought to bear thereon.

C is the clutch-block, having an arm, D, or other suitable connection reaching to the exterior, and so arranged that it may be turned or moved, and thus move the block. The shaft is recessed to receive this block, as plainly shown, and when the block is turned down therein, it rides freely within the hub of the wheel. When the block is turned so as to engage with the recess $a$ in the hub, its circular bearing upon the recess in the shaft renders it very strong and its hold upon the wheel unyielding. The front or face of the block, which bears upon the recess $a$, is circular, and its curve is struck from the same center as the opposite portion or back. This renders it easy to turn the block down out of engagement with the hub.

E is a collar bearing against the hub, and serving to protect the parts within from accumulation of foreign matters. The projection D is located outside of this collar. Any light spring, as $b$, operates to hold the clutch-block so that it will engage the hub of the wheel. When it is desired to unclutch, the force of this spring must be overcome.

F represents any tripping mechanism, as a bar arranged to be moved toward or from the shaft, as by a treadle or other movement. When the shaft is turning, by moving bar or tripper F so that it will come in contact with D, the clutch-block will be instantly turned down into its recess in the shaft, and the shaft will then be arrested, the wheel continuing its movement. Upon withdrawing tripper F, the clutch-block, under the influence of the spring, is, as soon as the recess $a$ is brought around to the proper point, forced to enter said recess, and then the shaft and wheel must turn together. This block is especially designed for very heavy and slowly-moving machinery; but it might be applied in other situations as well.

Instead of the wheel being made to revolve continuously, the shaft might be made to revolve and the wheel started or stopped, as required.

As shown in Figs. 1 and 3, the wheel has an elongated bearing upon that portion of the shaft represented at $e$. Under some circumstances, the wheel continues to revolve for a long time without being clutched to the shaft, and it is desirable to provide a long and smooth or unbroken bearing for it upon the shaft. The construction shown is such as to afford this bearing without weakening the shaft or the wheel or destroying the efficiency of the clutch.

The parts are all very simple, easily mounted and kept in order, and well calculated to answer the purpose or object of the invention as previously set forth.

Having now fully described my invention, what I claim as new, and desire to secure by Letters Patent, is—

1. The herein-described clutch-block mounted in a curved recess formed in the shaft, and having a curved face for bearing against the wall of the corresponding recess in the hub of the wheel, said block being arranged to be moved from the exterior of the wheel, substantially as shown and described.

2. The wheel provided with the enlarged hub, having the interior curved recess, as explained, the shaft having the elongated bearing for the wheel, the clutch-block curved on both bearing-faces, and mounted in a curved recess formed in the shaft, said recess arranged to accommodate the block while the wheel revolves, the collar, the projection on the clutch-block, by which it may be turned from the exterior down into the recess in the shaft, and the spring, combined and arranged substantially as shown and described.

In testimony that I claim the foregoing I have hereunto set my hand in the presence of two witnesses.

HERMAN SCHWEITZER.

Witnesses:
JOHN BUCKLER,
WORTH OSGOOD.